Sept. 4, 1934.  A. B. GARDNER  1,972,336
STABILIZER FOR AEROPLANES
Original Filed April 10, 1930  2 Sheets—Sheet 1
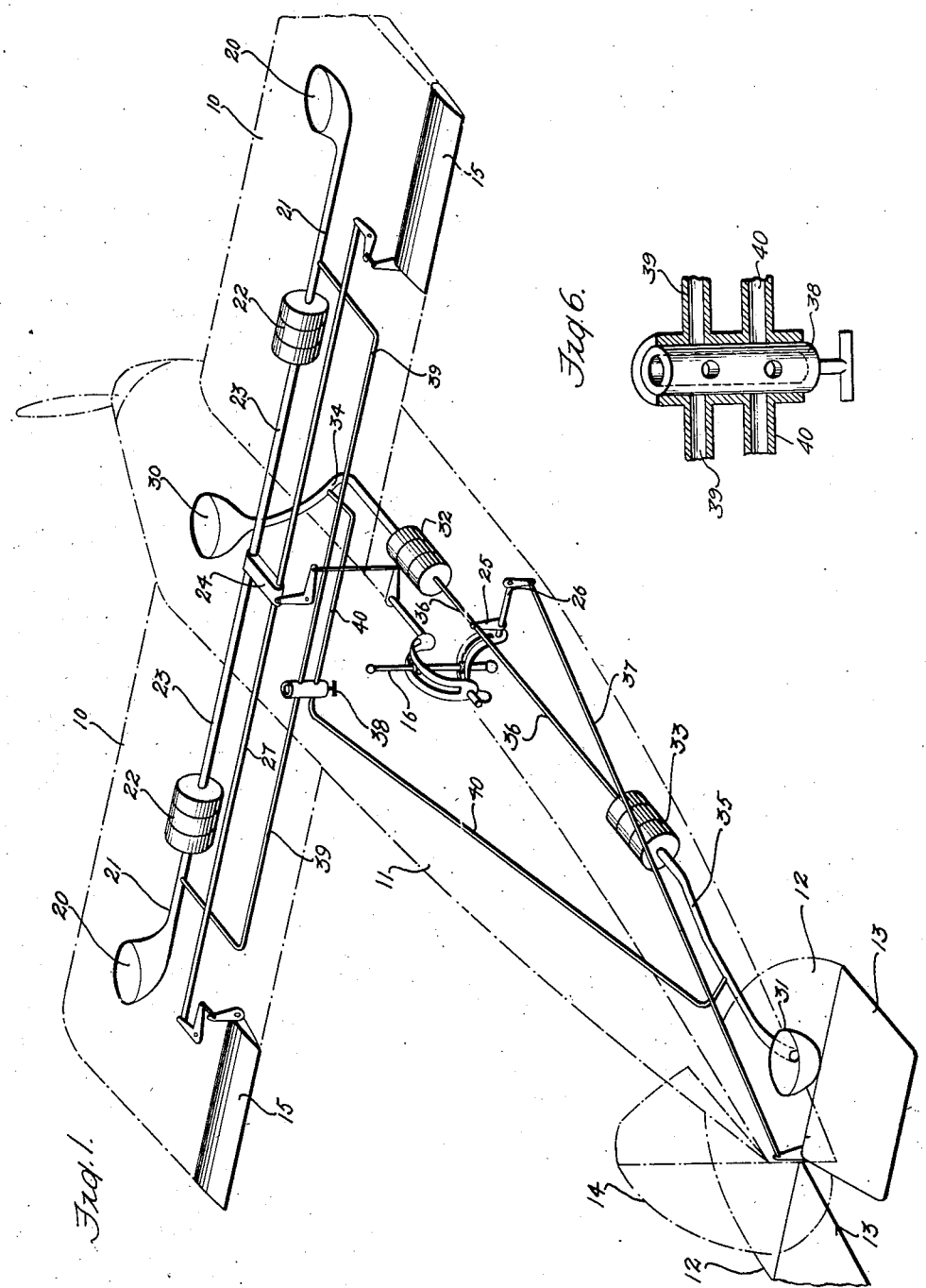

Sept. 4, 1934.     A. B. GARDNER     1,972,336
STABILIZER FOR AEROPLANES
Original Filed April 10, 1930     2 Sheets-Sheet 2
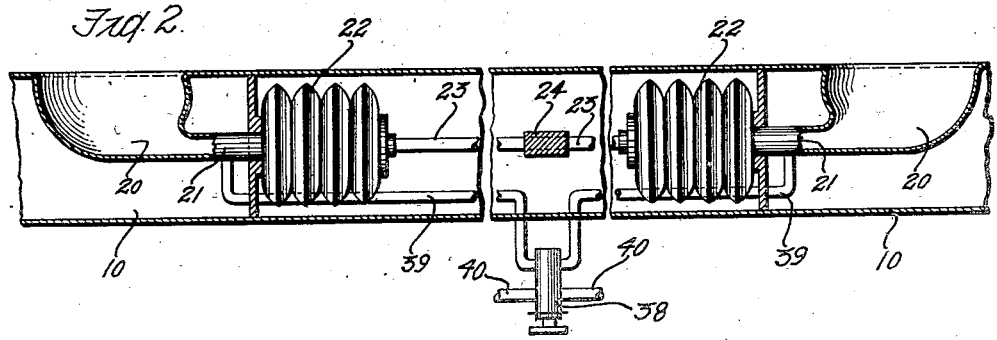
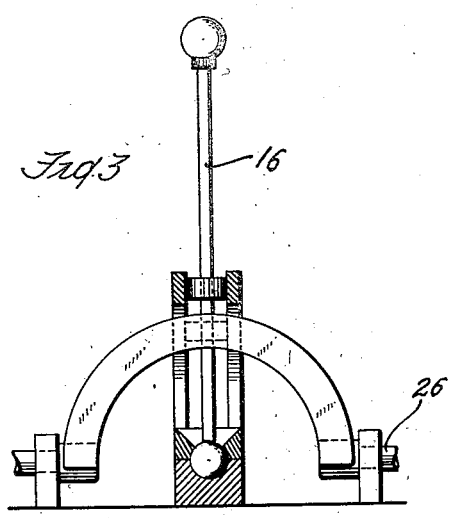
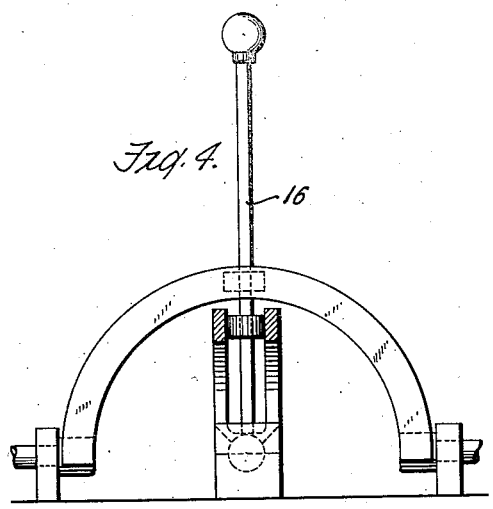
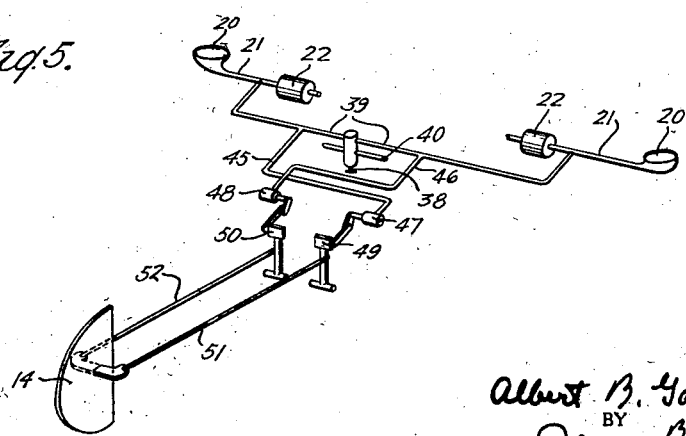

Patented Sept. 4, 1934

1,972,336

UNITED STATES PATENT OFFICE 1,972,336

STABILIZER FOR AEROPLANES

Albert B. Gardner, Racine, Wis.

Application April 10, 1930, Serial No. 443,139
Renewed May 21, 1934

25 Claims. (Cl. 244—29)

This invention relates to aircraft but more particularly to a method of and mechanism for automatically stabilizing the same.

One of the objects of the invention is to facilitate the control of aircraft and to render the use thereof more safe. Further objects will be in part obvious and in part pointed out hereinafter.

The invention accordingly consists in the features of construction, combination of elements, arrangements of parts and in the several steps and relation and order of the same, all as will be herein illustratively described and the scope of the application of which will be indicated in the following claims.

In the accompanying drawings in which are shown more or less diagrammatically the features of a selected embodiment of this invention:

Fig. 1 is a perspective view;

Fig. 2 is a fragmentary sectional view substantially longitudinally of the wings;

Figs. 3 and 4 are detail views of the control stick;

Fig. 5 is a perspective view of a slightly modified form; and

Fig. 6 is a detail view of the control valve.

Referring to the drawings, and more particularly to Fig. 1, there is shown diagrammatically, a conventional type of aeroplane provided with automatic controls embodying the principals of the invention. This aeroplane comprises the usual wings 10, body or fuselage 11, horizontal stabilizers 12, elevators 13, rudder 14, ailerons 15 and control lever 16.

The control lever 16 is usually referred to as the "stick" and this is connected to the ailerons 15 and the elevators 13 through a series of rods or wires which are more or less diagrammatically indicated in Fig. 1. In view of the fact that this system of manual controls is well known in the art, although the particular layout is varied in different types and makes of aeroplanes, the details thereof will not be described except in so far as this is necessary for a full understanding of the principals and mode of operation of the present invention. The ailerons serve to maintain the lateral balance of the aeroplane or to control the rolling movement thereof about the longitudinal axis of the fuselage and these are also used to provide banking at turns or otherwise, when desired by the pilot. The elevators 13 control the movement in a vertical plane or in other words cause the aeroplane to be directed upwardly, downwardly or on a level. The stick 16 is moved transversely of the fuselage to operate the ailerons, the direction of rolling motion provided being that in which the stick is moved. Movement of the stick longitudinally of the fuselage operates the elevators, forward movement causing the plane to go downwardly, and rearward movement, upwardly.

It is well recognized that the forward movement of the aeroplane produces a partial vacuum above the aerofoils or wings 10. When the degree of vacuum becomes less over one wing than over the other, this reduction in vacuum causes the wing to drop and thus produces a rolling movement of the aeroplane which normally is counteracted by the pilot by swinging the stick in the opposite direction. Similarly, when the degree of vacuum becomes greater or less over the wings than over the stabilizers, the nose of the aeroplane will rise or drop accordingly. This is counteracted by the pilot by moving the stick forward or back as the case may be. These differences in vacuum or air pressure over the two wings or over the wings and stabilizers are utilized in the present invention to automatically actuate the control mechanism.

Various forms of construction may be utilized to carry out the principals of the invention, but the form shown in the drawings will serve to illustrate one method of accomplishing this. The lateral control will first be considered.

In each of the wings at an interval from the fuselage there is provided a vacuum or pressure chamber 20 which communicates with the atmosphere upon the upper surface of the corresponding wing. A tube 21 connects each of these chambers with corresponding expansible and contractible elements 22 which in the present embodiment are in the form of bellows diaphragms though any other suitable type of element for this purpose may be used. To the inner end of each of these diaphragms is attached a rod or wire 23 which connects these diaphragms. An arm 24 connects this rod or wire 23 with the usual control rod or wire 27 by which the ailerons are manually operated from the stick 16 through the medium of suitable bell cranks, levers, etc. substantially as shown.

Referring to Fig. 1, when the vacuum over the left wing becomes less than over the right wing, due to air conditions or otherwise, normally causing the left wing to drop, the vacuum in the chamber 20 in this left wing will be correspondingly less than in the chamber in the right wing. This will cause the member 22 in the left wing to extend and the corresponding member in the right wing, to contract, moving the rods 23 and 27 to the right. This swings the aileron 15 in the left wing downwardly and correspondingly moves the aileron in the right wing upwardly, causing the left wing to be lifted and thus counteracting the action of the reduced vacuum over this wing. The ailerons are automatically operated in opposite direction when the vacuum over the right wing becomes less than that over the left wing.

The longitudinal control operates in substantially the same manner. A vacuum chamber 30, like one of the chambers 20, is provided in the wings in a suitable location. A similar chamber 31 is placed in one of the stabilizers 12. These chambers 30 and 31 communicate with expansible and contractible elements 32 and 33, like the elements 22, through tubes 34 and 35. The inner ends of these elements 32 and 33 are connected by a rod or wire 36 which is in turn connected by means of an arm 25 to the shaft 26 through which the elevators are manually operated by the stick 16. The method of making this connection with the manual controls will vary in different aeroplane constructions, but the simple form shown in the drawings will serve to illustrate the general principals thereof.

When the vacuum over the horizontal stabilizers 12 is less than over the wings, the tail portion of the aeroplane would normally drop, causing the nose to point upwardly. A corresponding difference of vacuum or air pressure would simultaneously be produced in the chambers 30 and 31 and thus the element 33 would automatically expand and the element 32 contract. This causes the rod 36 to be moved forwardly, swinging the elevators downwardly through the medium of the rod 37, and thus lifting the tail. This counteracts the change of direction of the aeroplane which otherwise would have occurred. Conversely, of course, a drop in the vacuum over the wings will cause the elevators to be automatically lifted and the normal tendency of the plane to travel downwardly is counteracted.

The extent of movement in either direction of the ailerons or the elevators will depend on the amount of difference in degree of vacuum in the corresponding vacuum chambers. While it has been found in practice that the action of the automatic control is not sufficient to materially interfere with the manual control, either or both of the automatic control systems may be temporarily rendered inoperative to permit the pilot to bank the aeroplane or to cause it to point upwardly or downwardly. This may be accomplished by various means, as for example, a manually operable valve 38 preferably located at a convenient place in the control cockpit. The valve 38 controls pipes 39 and 40 connecting the vacuum chambers 20 and the chambers 30 and 31 respectively, and when open acts to balance pressures in such chambers by establishing direct communication therebetween. The closing of this valve breaks such communication and the automatic control again becomes operative.

Referring to Fig. 5 there is shown a modification in which means are provided for rendering the vacuum chamber in either the right or left wing inoperative while the vacuum chamber in the opposite wing remains operative. The valves for this purpose are controlled by foot pedals which are mechanically connected to the steering rudder so that when the pilot wishes to make a turn, the shifting of the rudder for this purpose will cause the plane to automatically bank at the proper angle.

In the construction shown in Fig. 5, pipes 45 and 46 communicate with the pipe 39 on opposite sides of the valve 38. The pipe 45 is provided with an air admission valve 47 and a similar valve 48 is placed in the pipe 46. The valves 47 and 48 are mechanically connected to foot pedals 49 and 50 respectively which are in turn connected by rods 51 and 52 with the vertical rudder.

In operation the pilot presses the foot pedal 49 when he wishes to turn the plane to the right. This opens the air valve 47 and admits air to the pipe 39 through the pipe 45, thus rendering the vacuum chamber 20 in the left wing inoperative. This causes the left wing to rise in a banking action. In the same manner the pressing of the left pedal to cause the plane to turn to the left will open the valve 48, admitting air to the vacuum chamber in the right wing.

It will be obvious from the foregoing description that an aeroplane equipped with the control system forming the subject matter of this invention will be automatically maintained in a horizontal position in flight without any manipulation of the stick by the pilot. This not only very materially relieves the pilot but adds greatly to the safety of flying. Also the plane may be made to automatically bank when the rudder is moved to cause the plane to turn to the right or left.

While the invention has been described in connection with an aeroplane, it will be evident that it is applicable to other forms of aircraft.

It will be seen that there has been provided a construction and an art, both of an essentially practical nature in which the several objects of this invention are attained.

As many other embodiments may be made of the features of the above invention, and as the art herein described may be varied considerably, all without departing from the scope of the invention, it is to be understood that all matter herein set forth or shown in the accompanying drawings is to be interpreted as illustrative and not in a limiting sense.

I claim:

1. In an aircraft, control mechanism, pressure chambers open to the atmosphere only upon the upper surfaces of different parts of the aircraft, means responsive to differences in the pressures on said surfaces, and means actuated by said responsive means for automatically operating said control mechanism.

2. In an aircraft, control mechanism, pressure chambers communicating with the atmosphere only upon the upper surfaces of different parts of the aircraft, a pressure responsive element connected to each of said chambers, and means controlled by said elements for automatically operating said control mechanism in accordance with differences in pressure on said surfaces.

3. In an aircraft, control mechanism, a pair of pressure chambers communicating with the atmosphere only upon the upper surfaces of different parts of the aircraft, corresponding elements responsive to the pressure in said chambers, and means connecting said elements and operable by differences of pressure in said chambers to automatically operate said control mechanism.

4. In an aeroplane, control mechanism, vacuum chambers communicating with the atmosphere on the top surface of the wings only and on opposite sides of the fuselage, pressure responsive elements corresponding to said chambers and controlled by the pressure therein, and means actuated by said elements to automatically operate said control mechanism in accordance with differences in the degree of vacuum in said chambers.

5. In an aeroplane, control mechanism, a vacuum chamber communicating with the atmosphere only at the top surface of the wings, a second vacuum chamber communicating with the atmosphere only at the top surface of one of the horizontal stabilizers, and pressure responsive means connected to said chambers for automatically actuating said control mechanism in accordance with differences in degree of vacuum in said chambers.

6. The method of automatically stabilizing an aeroplane in flight which consists in utilizing differences in air pressure only above different parts of the aeroplane to operate the controls thereof.

7. In an aeroplane, control mechanism, pressure responsive means communicating with the atmosphere at the surface of the wings on different sides of the fuselage, means actuated by said pressure responsive means for automatically operating said control mechanism in accordance with differences of pressure on said wings, a vertical rudder, means for operating said rudder, and means for rendering one or the other of said responsive means inoperative in accordance with movement of said rudder by the rudder operating means.

8. In an aircraft, in combination, flight sustaining means, control means related to said last-mentioned means, and means responsive to the sustaining vacuum only above said flight sustaining means for actuating said control means.

9. In an aircraft, in combination, flight sustaining means, control means related to said last-mentioned means, pressure responsive bellows adapted to actuate said control means, and means connecting said bellows with the sustaining vacuum only above said flight sustaining means.

10. In an aircraft, in combination, flight sustaining means, a pair of ailerons related to said flight sustaining means, and means responsive to the sustaining vacuum only above said flight sustaining means for controlling the movement of said ailerons.

11. In an aircraft, in combination, a pair of wings, ailerons associated with said wings, means for controlling the position of said ailerons, and members disposed upon each of said wings responsive to the sustaining vacuum only above said wings for controlling the operation of said last-mentioned means.

12. In an aircraft, in combination, a pair of wings, ailerons associated with said wings, a pressure responsive bellows adapted to actuate said ailerons, and means connecting said bellows with the sustaining vacuum only above said wings.

13. In an aircraft, in combination, a pair of wings, ailerons associated with said wings, a pair of pressure responsive bellows for controlling the movement of said ailerons, means connecting one of said bellows with the sustaining vacuum only above one wing, and means connecting the other of said bellows with the sustaining vacuum only above the other wing.

14. In an aircraft, in combination, a pair of wings, ailerons associated with said wings, a pair of pressure responsive bellows for controlling the movement of said ailerons, means connecting one of said bellows with the sustaining vacuum only above one wing, and means connecting the other of said bellows with the sustaining vacuum only above the other wing at a point substantially similar in position to the position of said last-mentioned means.

15. In an aircraft, in combination, a fuselage, elevators associated with said fuselage, and means responsive to the sustaining vacuum only above said fuselage and at more than one point along its length for controlling the movement of said elevators.

16. In an aircraft, in combination, a fuselage including a tail, elevators associated with said tail, pressure responsive means for controlling the movement of said tail, and means in contact with the sustaining vacuum only above said fuselage and said tail connected to said last-mentioned means.

17. In an aircraft, in combination, a fuselage including a tail, elevators associated with said tail, a pair of pressure responsive bellows adapted to control the movement of said elevators, means located in the vicinity of said tail for connecting one of said bellows with the sustaining vacuum only above said tail, and means located substantially near the front end of said fuselage connecting the other of said bellows with the sustaining vacuum only above that portion of the fuselage.

18. In an aircraft, in combination, a pair of wings, ailerons associated with said wings, a horizontal stabilizer, elevators associated with said horizontal stabilizer, means for controlling the movement of said ailerons, means for controlling the position of said elevators, and members distributed at various points on the wings and stabilizer responsive to the sustaining vacuum only above these parts for actuating said last two mentioned means.

19. In an aircraft, in combination, a pair of wings, ailerons associated with said wings, a horizontal stabilizer, elevators associated with said horizontal stabilizer, means for controlling the movement of said ailerons, means for controlling the position of said elevators, members located only on the upper surface of each wing for actuating said ailerons, and members located on said vertical horizontal stabilizer and at a point in front thereof.

20. In an aircraft, in combination, a pair of wings, ailerons for said wings, a horizontal stabilizer, elevators associated with said stabilizer, pressure responsive bellows for controlling the movement of said ailerons, pressure responsive bellows for controlling the movement of said elevators, spaced members associated with said wings for connecting said first-mentioned bellows to the sustaining vacuum only above said wings, and spaced members one of which is associated with said stabilizer for connecting said last-mentioned bellows with the sustaining vacuum above said stabilizer and in the vicinity of the center of said wings.

21. In an aircraft, in combination, a pair of wings, ailerons associated with said wings, a horizontal stabilizer, elevators associated with said stabilizer, means for controlling the movement of said ailerons, means for controlling the position of said elevators, members distributed at various points on the wings and stabilizer responsive to the sustaining vacuum only above these parts for actuating said last two mentioned means, manually operable means for controlling the movement of said ailerons and said elevators, and means for rendering said aileron controlling means and said elevator controlling means inoperative.

22. In an aircraft, in combination, a pair of wings, ailerons associated with said wings, means for controlling the position of said ailerons, members disposed upon each of said wings responsive to the sustaining vacuum only above said wings for controlling the operation of said last-mentioned means, means for rendering said last-mentioned means inoperative, and manually operable means for controlling the movement of said ailerons.

23. In an aircraft, in combination, means for maintaining horizontal equilibrium, means for maintaining vertical equilibrium, and means responsive to the sustaining vacuum only above said plane for controlling the action of said last two mentioned means.

24. In an aircraft, in combination, means for maintaining horizontal equilibrium, means for maintaining vertical equilibrium, a plurality of pressure responsive bellows adapted to control the movement of said last two mentioned means, and means for connecting said bellows to the sustaining vacuum at various points only on the upper surface of the plane.

25. In an aircraft, in combination, control mechanism, and means for automatically operating said control mechanism by the difference in the degree of the sustaining vacuum situated only above different parts of the aircraft.

ALBERT B. GARDNER.